United States Patent [19]
Leistner

[11] 3,899,704
[45] Aug. 12, 1975

[54] STARTER OR DAMPER WINDING ARRANGEMENT FOR A SYNCHRONOUS ELECTRICAL MACHINE

[75] Inventor: Werner Leistner, Berlin, Germany

[73] Assignee: Siemens Aktiengesellschaft, Munich, Germany

[22] Filed: Mar. 5, 1974

[21] Appl. No.: 448,299

[30] Foreign Application Priority Data
Mar. 7, 1973 Germany.............................. 2311945

[52] U.S. Cl.................................. 310/183; 310/269
[51] Int. Cl. ............................................ H02k 3/11
[58] Field of Search ........... 310/182, 183, 194, 197, 310/211, 710, 269

[56] References Cited
UNITED STATES PATENTS

| | | | |
|---|---|---|---|
| 1,030,041 | 6/1912 | Williamson | 310/183 |
| 1,508,251 | 9/1924 | Reist et al. | 310/183 |
| 1,908,158 | 5/1933 | Mortensen | 310/183 |
| 3,793,546 | 2/1974 | King, Jr. | 310/211 X |

*Primary Examiner*—Donovan F. Duggan
*Attorney, Agent, or Firm*—Kenyon & Kenyon Reilly Carr & Chapin

[57] ABSTRACT

To improve the starting conditions in a synchronous machine with a starter or damper winding, the respective bars of the winding are provided with insulation and are connected at one end with corresponding insulated resistors which, in turn, are mutually connected by a shorting ring.

5 Claims, 3 Drawing Figures

PATENTED AUG 12 1975 3,899,704

STARTER OR DAMPER WINDING ARRANGEMENT FOR A SYNCHRONOUS ELECTRICAL MACHINE

BACKGROUND OF THE INVENTION

It is known to equip synchronous electric machines with a starter or damper winding so that they can be self-started asynchronously. The bars of the starter or damper windings are located in the pole shoes of the machine and are connected with each other at the end faces by shorting rings.

Such asynchronous starting of a synchronous machine leads to considerable sudden heating in the area of the pole shoe surface because the kinetic energy present in the rotating parts of the machine at rated speed is essentially stored as dissipation energy in the area of the pole piece surface during the start-up operation.

If the machine is equipped with laminated poles and a conventional starter or damper winding, excessive temperatures can occur in the region of the damper winding, which cannot always be removed in a satisfactory manner even by cooling the damping winding with water. In such cases, for example, as in a synchronous electric machine of a pump storage plant, the poles of the machine have already been made solid, in order to thereby increase the heat capacity and to keep the temperature rise within permissible limits. However, it is a disadvantage, if solid poles are used, that the pole piece surface losses are substantially increased and decrease the efficiency as compared to a machine with laminated poles and a damper winding. The manufacture of solid poles is furthermore more expensive than that of laminated poles.

SUMMARY OF THE INVENTION

Accordingly, it is an object of the invention to provide an arrangement for a winding suitable as a starter winding and/or as a damper winding which will enable a synchronous machine to be equipped with laminated poles. Subsidiary to this object, it is an object of the invention to provide such a winding arrangement which will not produce excessive temperatures in the region of the damper winding during asynchronous start-up.

The winding arrangement of the invention is suitable for an electrical synchronous machine such as those of the vertical construction type with laminated poles. According to a feature of the invention, each bar of the starter or damper winding carries in such a synchronous machine insulation and is connected on one end with additional, like-wise insulated resistors which, in turn, are at their ends away from the bars, connected with a shorting ring. The bars of the starter or damper winding are directly connected with a first shorting ring at only one end, while on the other end of each bar, an insulated resistor is serially connected therewith. A second shorting ring connects the other ends of the resistors together.

This arragement achieves the condition that part of the starting heat appears not in the vicinity of the pole shoe surface, but rather, is shifted to these additional resistors. The subdivision of the heat generated during the start-up can be influenced as desired by suitable choice of the resistance values. The temperature rise of the starter or damper winding in the area of the pole shoes is thus reduced. In addition, the starting torque is increased by the inserted additional resistors. This means that the machine reaches synchronous speed faster than otherwise.

Because of the arrangement of the additional, insulated resistors in slots of a ferromagnetic material, the stray inductance of the starter or damper winding can furthermore be varied and the starting reactance can thereby be increased, which makes a reduction of the starting current possible, which is of advantage for the system. Through a different configuration of the slots containing the additional resistors, the condition can be achieved that the bars of the starter or damper winding situated at the edge and in the center of the poles each carry approximately the same current.

Although the invention is illustrated and descrieed herein as a starter or damper winding arrangement for a synchronous electrical machine, it is nevertheless not intended to be limited to the details shown, since various modifications may be made therein within the scope and the range of the claims. The invention, however, together with additional objects and advantages will be best understood from the following description and in connection with the accompanying drawings.

DESCRIPTION OF THE PREFERRED EMBODIMENTS OF THE INVENTION

Figure 1:
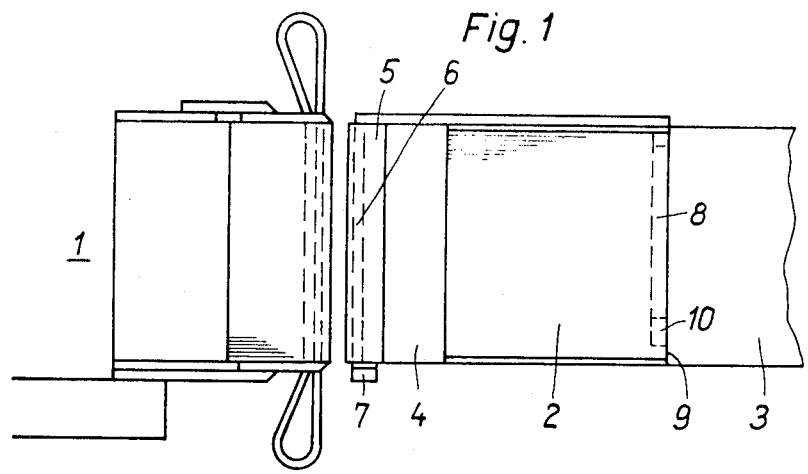
FIG. 1 is a schematic outline diagram of a radial section of an electrical synchronous machine of vertical construction equipped with a winding arrangement according to the invention.
Figure 2:
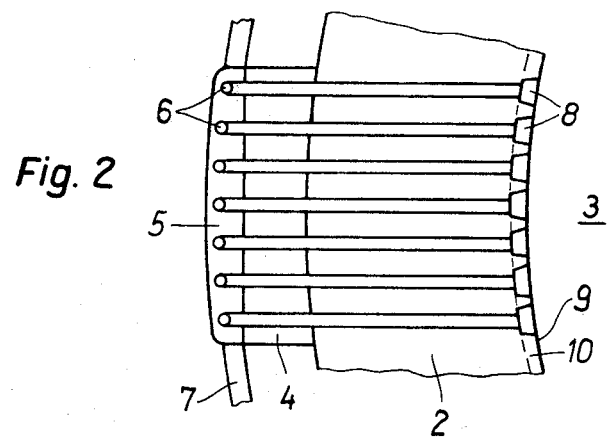
FIG. 2 illustrates a pertinent portion of the rotor of the synchronous machine showing the spacial disposition of the elements making up the winding arrangement according to the invention.

In electric pump storage plants, the synchronous electric machine, which is connected with the pump or the turbine or the turbopump, must be started up asynchronously very fast. For this purpose and referring to FIG. 1, the poles 4 are equipped with bars 6 of a starter or damper winding in the pole shoes 5. The poles 4 are arranged on a lamination chain 2 of the rotor 3 of the machine. On the lower side of the poles 4, the bars 6 of the starter or damper winding are connected directly with each other by means of a shorting ring 7. On the upper end-face of the rotor 3, however, the damper bars 6 are brought to additional resistors 8, which are disposed in slots in the cylindrical surface 9 of the lamination chain 2 and are, in turn, connected with each other by the shorting ring 10. The individual bars 6 of the starter or damper winding each carry insulation and also the additional resistors 8 are provided with insulation, while the shorting rings 7 and 10 require no insulation.

Because of these resistors 8 additionally inserted into the starter or damper windings, the starting torque for the asynchronous starting of the synchronous machine 1 is increased. In addition, the loss heat produced during the asynchronous startup no longer appears only in the region of the pole shoes 5, but is instead now shifted to these resistors 8 to an extent that can be influenced by a suitable choice of the resistance values. The starting heat occurring in the poles 4 is thereby reduced, so that the poles 4 can be constructed as laminated poles without exceeding the permissible maximum temperatures during the asynchronous start-up.

It is advantageous to select as the additional resistors 8 solid bars of a suitable material, for example, iron. It is also preferable to cover the bars with insulation. In order to relieve the resistors 8 of the centrifugal forces caused by the rotation of the rotor 3, it is advantageous to arrange the same on the inner cylindrical surface 9 of the lamination chain 2, which because of its ring shape takes up the centrifugal stresses of the resistors 8 in a simple manner. Because the resistors 8 are placed in slots there, the stray inductance of the starter or damper winding can be varied and thus, the starting reactance thereby increased. Accordingly, the starting currents to be furnished from the system for the synchronous start are smaller.

Figure 3:
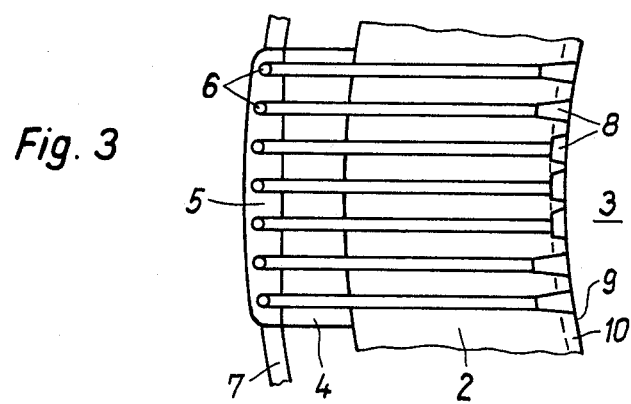
FIG. 3 shows the pertinent portion of a synchronous machine equipped with a winding arrangement wherein the slots accommodating the resistors are configured to cause the winding bars disposed at the edge of the pole to conduct approximately the same current as the winding bars disposed in the center portion of the pole.

FIG. 3 illustrates a subsidiary embodiment of the invention. A portion of the winding bars of the winding arrangement are arranged in the center region of the pole and the remainder of the winding bars are distributed at an edge portion of the pole. FIG. 3 also shows how the slots for the resistors corresponding to the winding bars at the center portion, are configured differently from the slots accommodating the resistors corresponding to the winding bars at the edge portion of the pole. The arrangement illustrated achieves the condition that all winding bars carry approximately the same current.

The winding arrangement according to the invention can also be utilized with a synchronous machine equipped with a laminated link rotor. For a detailed description of the construction of such a rotor, see Moeller, Werr, *Leitfaden der Elektrotechnik* Vol. III, "Konstruktion und Festigkeitsberechnungen elektrischer Maschinen" (3d ed. 1955) pp. 40–41.

What is claimed is:

1. In an electrical synchronous machine such as of the vertical type or the like having a rotor equipped with laminated poles, an arrangement for a winding suitable as a starter winding, a damper winding or a starter-damper winding comprising: a first shorting ring, a plurality of insulated resistors, a body of ferromagnetic material forming part of the rotor and having slots for accommodating said insulated resistors therein, a plurality of insulated winding bars mounted on at least one of the poles, one end of each of said bars being connected to said first shorting ring and the other end of each of said bars being connected to a corresponding one of said resistors at one end thereof, and a second shorting ring connected to the other end of each one of said resistors.

2. In an electrical synchronous machine such as of the vertical type or the like having a rotor equipped with laminated poles, an arrangement for a winding suitable as a starter winding, a damper winding or a starter-damper winding comprising: a first shorting ring, a plurality of insulated resistors, a body of ferromagnetic material forming part of the rotor and having slots for accommodating said insulated resistors therein, a plurality of insulated winding bars mounted on at least one of the poles, one end of each of said bars being connected to said first shorting ring and the other end of each of said bars being connected to a corresponding one of said resistors at one end thereof, and a second shorting ring connected to the other end of each one of said resistors, a portion of said winding bars being arranged in the central portion of the pole and the remainder of said winding bars being placed at an edge of the pole, a portion of said resistors being connected to corresponding ones of said portion of said winding bars and the remainder of said resistors being connected to corresponding ones of said remainder of said winding bars, the slots corresponding to said portion of said resistors being configured differently from the slots corresponding to said remainder of said resistors so as to cause each of said winding bars to carry approximately the same current.

3. The winding arrangement according to claim 1 wherein the rotor is a laminated link rotor including said body in the form of a laminated stack, said resistors being disposed on the inner surface of the laminated stack.

4. The winding arrangement according to claim 1, said resistors being solid.

5. The winding arrangement according to claim 4, said resistors being made of iron.

* * * * *